United States Patent Office 3,346,131
Patented Oct. 10, 1967

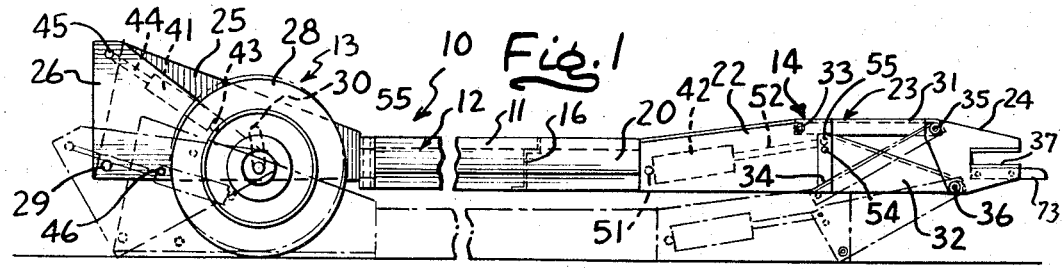
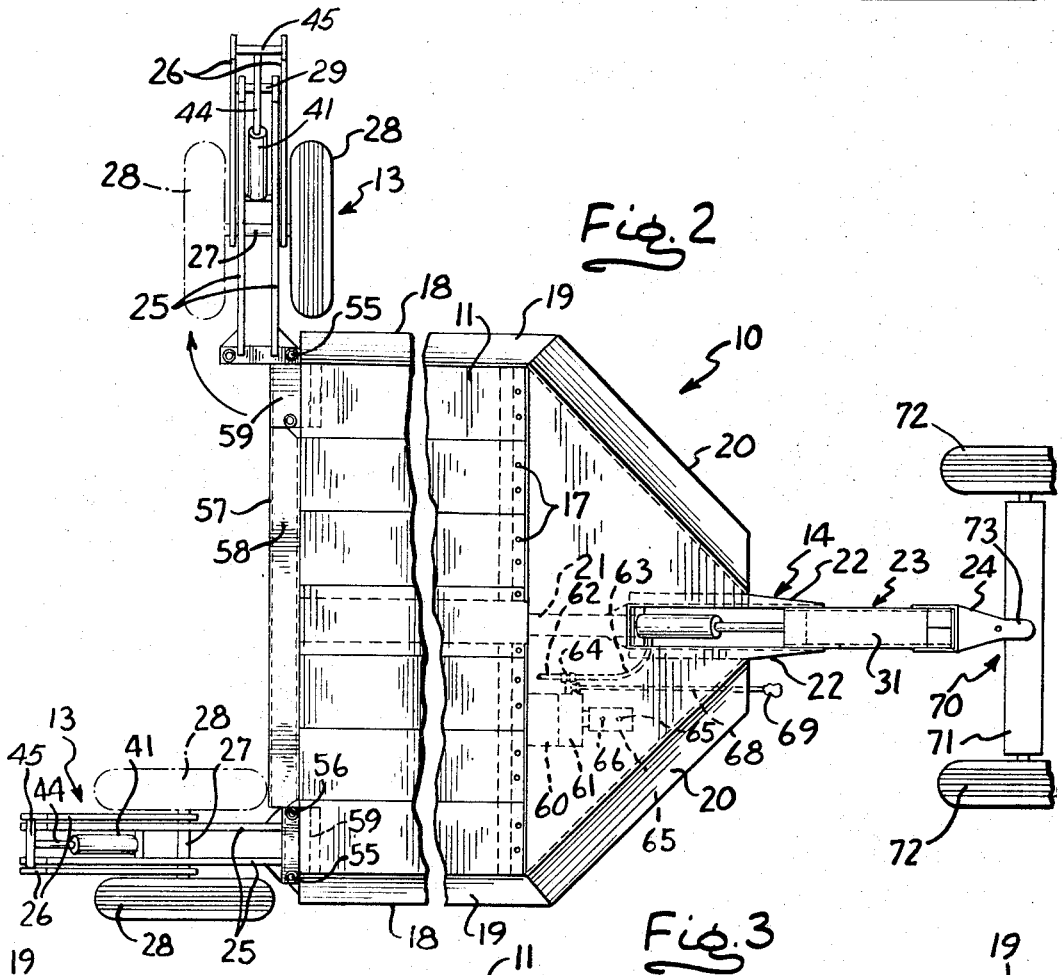
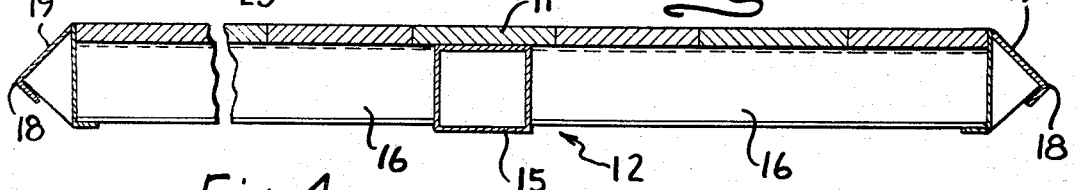
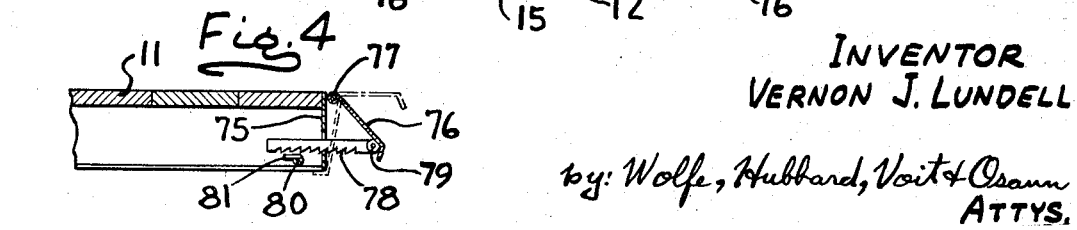

3,346,131
HYDRAULIC TRANSPORTER TRAILER
Vernon J. Lundell, Cherokee, Iowa 51012
Filed Aug. 4, 1965, Ser. No. 477,137
10 Claims. (Cl. 214—506)

ABSTRACT OF THE DISCLOSURE

A transport trailer having wheel and axle assemblies vertically movable for raising and lowering the trailer bed and horizontally swingable between trailing positions and transverse positions whereby substantially the entire rear edge of the bed is free for loading the trailer and including a coupling element with means for raising and lowering the bed with respect thereto.

---

The present invention relates generally to trailers and more particularly concerns power elevated transport trailers.

Recently, the use of trailers has become quite widespread for moving farm implements and other machinery that cannot otherwise be conveniently or rapidly transported from one place to another. While many improvements have, in the past, been made in the construction and arrangement of such trailers, all of these prior trailers have suffered from various shortcomings due to their cost, complexity, or the convenience with which they may be loaded and unloaded.

Accordingly, it is the primary aim of the present invention to provide a rugged, low cost transport trailer which affords simplified loading and unloading from the trailer bed which may be conveniently raised or lowered.

A more specific object of the invention is to provide a transport trailer wherein the supporting frame and bed of the trailer may be lowered with respect to the supporting wheels and hitch coupling so that the frame rests on the ground during loading or unloading.

It is also an object of the invention to provide a trailer of the above type wherein the support wheels of the trailer may be swung outboard of the trailer bed thereby making substantially the entire rear edge of the trailer available for loading or unloading.

Another object of the invention is to provide such a trailer with a marginal frame portion constructed in the form of an inclined ramp to facilitate loading and unloading.

A further object is to provide a trailer of the type described above that includes independent hydraulic actuators for raising and lowering the trailer bed with respect to the support wheels and hitch coupling and means for selectively controlling the supply of hydraulic fluid to the actuators whereby one end or the entire trailer bed may be raised and lowered as desired.

Other objects and advantages of the invention will become more readily apparent upon reading the following detailed description and upon reference to the attached drawings, in which:

FIGURE 1 is a fragmentary side elevational view of a transport trailer embodying the features of the present invention with certain portions illustrated in alternate positions by dash line representations.

FIG. 2 is a fragmentary plan view of the trailer shown in FIG. 1 with one wheel and axle assembly shown in trailing position and the other wheel and axle assembly shown in its transverse loading position.

FIG. 3 is a section taken substantially as seen along the line 3—3 in FIG. 2; and FIG. 4 is a fragmentary section similar to FIG. 3 showing a modification of the edge ramp construction of the invention.

While the present invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to the drawings, there is shown in FIGURE 1 an illustrative transport trailer 10 embodying the features of the present invention. The trailer 10 includes a generally rigid rectangular bed 11 secured to a frame indicated generally at 12, which is normally supported by a pair of wheel and axle assemblies 13 and a coupling assembly 14.

In the illustrative embodiment, the frame 12 includes a centrally located longitudinal box section 15 and a plurality of transversely disposed Z-shaped web members 16. The bed 11 comprised in this instance of a plurality of longitudinally disposed planks is secured to the upper surface of the web members 16 by any suitable means such as bolts 17. As shown in FIGS. 2 and 3, the lateral edges of the trailer are defined by longitudinally disposed frame components 18 constructed in the form of ramps having upper surfaces 19 sloping downwardly and outwardly from the bed 11. This arrangement, of course, facilities the side loading and unloading of the trailer 10 in addition to providing increased rigidity to the frame 12.

At the forward end of the trailer 10, the ramp members 18 are rigidly secured to a pair of forwardly and inwardly directed frame elements 20, which are also constructed with a generally triangular shape to further stiffen the frame 12. Projecting forwardly from the box section 15 is an extension member 21, the forward end of which is defined by a pair of laterally spaced plates 22, respectively secured to the inwardly directed frame elements 20. A tongue assembly 23 is mounted between the plates 22 and carries a jaw-shaped coupling element 24 at its forward end.

The wheel and axle assemblies 13 are mounted adjacent the rear edge of the trailer bed 11 in the illustrative embodiment and desirably are secured to the outer ends of the most rearward Z-shaped web member 16. As shown in the drawings, each of the wheel and axle assemblies includes a pair of spaced apart support plates 25 illustrated as generally triangular in shape, which mount a pair of carrier plates 26, also illustrated as triangular in shape. An axle 27 is mounted at the forward end of each pair of the spaced apart carrier plates 26 and, as shown in FIG. 2, each axle journals a pair of ground engaging support wheels 28 at its ends. It will be understood, of course, that if a lighter duty transport trailer is desired, only a single wheel 28 may be carried by each axle 27.

In accordance with the present invention, provision is made for selectively raising and lowering the trailer bed 11 and frame 12 with respect to the wheel and axle assemblies 13 and the coupling element 24 during loading and unloading of the trailer. To this end, the carrier plates 26 are pivotally mounted outwardly adjacent their respective support plates 25 by means of a hinge pin 29 or the like. Each of the support plates 25 also defines a generally arcuate slot 30 which accommodates vertical movement of the respective axle 27 therein. Thus, the forward ends of the carrier plates 26, and the corresponding wheels 28 and axle 27 may be moved vertically with respect to the support plates 25. Conversely stated, the trailer bed 11 and frame 12 may be raised and lowered with respect to the ground engaging wheels 28.

The forward end of the trailer may also be raised and lowered with respect to the hitch coupling element 24. To accomplish this function, the tongue assembly 23 is pivotally mounted at the forward end of the frame extension plates 22 for movement in a generally vertical plane. The relative vertical movement of the coupling element 24 with respect to the trailer bed 11, of course, results conversely in raising or lowering the forward portion of the bed 11 provided that the coupling element 24 is maintained a fixed distance above the ground such as by a tractor drawbar or other hitch element.

It is a further feature of the present invention that the coupling element 24 is maintained in a generally horizontal disposition as the tongue assembly 23 is swung through a vertical arc. Accordingly, the tongue assembly 23 in the illustrative embodiment is formed by a pair of generally parallel upper and lower members 31 and 32, respectively, each of which is pivoted at its opposite ends to the frame extension plates 22 and the coupling element 24 by vertically spaced apart pivot pins 33, 34, 35 and 36, respectively. The resulting parallelogram action of the elements 31, 32 as the coupling element 24 is moved insures that a connecting surface 37 defined by the jaw-shaped coupling element does not bind or twist with the complementary drawbar element that is engagable therewith.

For raising the trailer bed 11 and frame 12 with respect to the wheel and axle assemblies 13 and the coupling element 24, hydraulic actuators 41 and 42 are respectively provided for the wheel and axle assemblies 13 and tongue assembly 23. Each of the hydraulic actuators 41 are preferably anchored by a cross pin 43 between each pair of the support plates 25 and the operating rod 44 is similarly coupled to the carrier plates 26 by a pin 45. Referring to FIG. 1, it will be seen that extension of the actuator 41 results in raising the wheels 28, or lowering the rear portion of the trailer bed with respect thereto. Conversely, retracting the actuator results in raising the bed 11 to its normal transport position. A lock pin 46 is also provided to secure the carrier plates 25 to the support plates 24 when the trailer is in transport position thereby relieving the actuators 41 from the weight of the trailer and its load.

Vertical movement of the tongue assembly is controlled by the actuator 42 which is anchored by a cross pin 51 between the extension plates 22. The operating rod 52 of the actuator 42 is secured by a similar pin 53 to the upper rear portion of the lower tongue element 32. To retain the coupling element in its transport position without unnecessarily loading the actuator 42 a lock pin 54 is provided for rigidy securing the lower tongue element 32 to the frame extension plates 22.

Pursuant to another aspect of the present invention, substantially the entire rear edge of the trailer bed 11 may be made available to facilitate loading and unloading of the trailer 10. As shown in FIG. 2, each of the wheel and axle assemblies 13 is secured to the outer ends of the rear web member 16 by means of an outer, vertically disposed pivot pin 55 and an inner vertically disposed retaining pin 56. Thus, after the rear edge of the trailer bed 11 and frame 12 has been lowered by the actuators 41 into ground engaging contact, the retaining pins 56 may be removed and each of the wheel and axle assemblies may be swung into a transversely oriented position outboard of the sides of the trailer. When the trailer is to be moved, the wheel and axle assemblies 13, of course, are returned to their normal trailing positions and the retaining pins 56 are reinserted before the hydraulic actuators 41 are retracted to raise the trailer bed 11.

The rear loading and unloading of the trailer 10 is further enhanced by the incorporation of a ramp-like frame element 57, similar to the side ramps 18, which is secured to and reinforces the rear web member 16. The upper surface 58 of the ramp element slopes downwardly and rearwardly from the bed 11 thereby facilitating the movement of implements or other machinery onto the bed when it is in its lowered position. In the embodiment illustrated in FIGS. 1 and 2, the ramp 57 terminates somewhat inboard of the ramp elements in view of the connection of the wheel and axle assemblies 13 to the web member 16 by the pins 56.

The present invention also contemplates the incorporation of a pair of retractable rear ramp elements 59 located adjacent the ends of the ramp 57. As shown in FIGS. 1 and 2, the ramp elements 59 are horizontally pivoted at the rear corners of the trailer 10 and when the wheel and axle assemblies 13 are swung into their transverse positions the ramp elements may be folded down so as to effectively form continuations of the ramp 57. Conversely, when the wheel and axle assemblies are to be returned to their trailing positions, the ramp elements 59 must first be raised to their transport positions (see FIG. 1).

For operating the actuators 41, 42, the trailer may be provided with a self-contained hydraulic system including a reservoir 60, pump 61 and front and rear fluid supply lines 62 and 63, respectively. A three-way valve 64 interposed between the pump 61 and the supply lines 62, 63 affords a convenient control element for simultaneously or independently regulating the supply and discharge of hydraulic fluid to the actuators 41, 42. In this way the front or rear of the trailer 10 or the entire bed 11 of the trailer may be selectively raised or lowered. To drive the pump 61, an electric motor 65 is provided in the preferred embodiment. The motor 65 may be of the type used to start an internal combustion engine and thus be adapted for energization by coupling one end of a pair of jumper cables (not shown) to terminals 66 and 67 on the motor 65 and the other ends of the cables to the terminals of an automotive battery. In this way, the electrical system of the vehicle that draws the trailer 10 can be used to advantage in raising and lowering the trailer bed 11.

An alternative arrangement for powering the hydraulic actuators 41, 42 is also provided for the present invention for use when the trailer 10 is coupled to a farm tractor or the like (not shown) which conventionally has an auxiliary hydraulic supply line. For this purpose, a separate hydraulic supply line 68 may be coupled at one end to the valve 64 and the other end may be equipped with a conventional quick-coupler connection and plug arrangement 69 of the type well known in this art. For the sake of simplicity and low cost the actuators 41, 42 could, of course, be actuated by a hand pump at a remote location or each of the actuators could be constructed in the form of a hand operated hydraulic jack of well known construction.

In the event that the trailer 10 is to be trailed behind an automobile or light truck (not shown) and if the weight of the trailer and its load may frequently exceed the load desirably imposed on the vehicle hitch or drawbar, an auxiliary dolly 70 may be interposed between the trailer 10 and the pulling vehicle to carry the weight on the front end of the trailer. The dolly 70 may be of relatively simple design in the form of an unsprung axle assembly 71 which journals a pair of spaced apart support wheels 72. A forwardly projecting tongue 73 on the coupling element 24 may be pivotally connected to the axle assembly 71 in any convenient manner and a conventional coupling may be used for drawing the dolly behind the pulling vehicle.

Turning now to FIG. 4, there is shown a modified embodiment of the ramp-like frame elements 59. As shown here, the marginal edge portion of the trailer is defined by a generally vertical frame element 75 to which an adjustable ramp element 76 is pivoted at its upper edge by a longitudinally disposed pin 77. At spaced intervals along the marginal edge portion a notched arm 78 is provided to selectively locate the adjustable ramp 76 with respect to the vertical frame element 75. Each arm 78 is secured at one end to the ramp 76 by a pin 79 and the other end of the arm is adapted to project through a vertical slot (not shown in detail) in the wall 75. An elongated control rod 80 is provided with a finger 81 engagable with each arm 78 so that upon rotation of the rod, the arms 78 will all be simultaneously released from engagement with the slotted wall 75 and the ramp may be moved to the newly selected position. It will be understood that such an adjustable ramp 76 may be provided at the rear edge of the trailer as well as along one or both lateral edges of the trailer.

It will be readily appreciated from the above description that the trailer 10 of the present invention is of rugged yet low cost construction which may be conveniently loaded and unloaded by simply lowering the bed 11 with respect to the wheels and axle assemblies 13 and the coupling element 24. Moreover, the arrangement of the hydraulic actuators 41, 42 provides for both simple and selective raising and lowering of the front, rear, or the entire bed of the trailer. In addition, the pivotal mounting of the wheel and axle assemblies 13 allows substantially the entire rear edge of the trailer to be utilized for loading and unloading operations and the marginal edge ramps and elements, whether fixed or adjustable, further facilitie this operation.

I claim as my invention:

1. A transport trailer comprising, in combination, a supporting frame, means defining a substantially rigid bed secured to said frame, an extension projecting forwardly from said frame, a coupling element secured to said extension, two pairs of laterally spaced support plates pivotally mounted on the rear edge of said frame for horizontal swinging movement between trailing and transversely oriented positions, means for securing said pairs of support plates in said trailing position, a pair of carrier plates pivotally mounted on each pair of said support plates for vertically swinging movement, a wheel and axle assembly carried by each pair of said carrier plates, and means for vertically swinging said carrier plates so as to raise and lower said frame and bed between transport and loading positions.

2. The combination defined in claim 1 wherein said bed and frame are generally rectangular and said pairs of support plates are mounted adjacent the rear corners of said frame, and said wheel and axle assemblies being disposed outboard of said bed and frame when said support plates are swung to said transversely oriented positions whereby substantially the entire rear edge of said bed is available for loading and unloading said trailer.

3. The combination defined in claim 1 wherein said support plates and carrier plates are generally triangular in shape and pivotally interconnected adjacent the lower rear corners thereof, the means for vertically swinging said carrier plates includes a hydraulic cylinder secured at one end to the upper rear corner of said carrier plates and at the other end to said carrier plates intermediate the corners thereof, and independent means are provided for interconnecting said respective support and carrier plates so as to retain said support plates in transport position.

4. The combination defined in claim 1 wherein said coupling element is secured to said extension by a vertically swingable tongue assembly, said tongue assembly being constructed and arranged to maintain said coupling element in a generally horizontal orientation as said tongue assembly is swung between transport position and loading position, and means including a hydraulic actuator secured to said extension is provided for vertically swinging said tongue assembly.

5. The combination defined in claim 1 wherein said bed and frame are generally rectangular and a peripheral ramp is secured to the edges of said frame at the sides and rear thereof to define an inclined surface sloping downwardly and outwardly from said bed.

6. The combination defined in claim 5 wherein said inclined surface of said ramp at least at one edge of said frame is selectively positionable in a plurality of positions ranging from horizontal to vertical and means are provided for locating and retaining said positionable surface in any of said positions.

7. A transport trailer comprising, in combination, a supporting frame, means defining a substantially rigid bed secured to said frame, an extension projecting forwardly from said frame, a tongue assembly mounted at the forward end of said extension for swinging movement in a generally vertical plane, said tongue assembly including upper and lower members and a coupling element with said upper and lower members each pivoted at one end in vertically spaced relation to said extension and pivoted at the opposite end in vertically spaced relation to said coupling element, said coupling element having a generally horizontally disposed connecting surface, and means interconnected with said extension and said tongue assembly for vertically swinging said assembly whereby said frame and bed may be selectively raised and lowered with respect to said coupling element without substantially altering the generally horizontal disposition of said connecting surface.

8. The combination defined in claim 7 including a pair of laterally spaced wheel and axle assemblies mounted in trailing relation adjacent the rear edge of said frame and bed, means for selectively raising and lowering said frame and bed in relation to said assemblies, respectively, between transport and loading positions, and means for laterally swinging each of said assemblies outwardly with respect to said frame and bed whereby substantially the entire rear edge of said frame and bed are available for loading and unloading said trailer.

9. The combinatiton defined in claim 7 including two pairs of laterally spaced support plates pivotally mounted on the rear edge of said frame for horizontal swinging movement between trailing and transversely oriented positions, means for securing said pairs of support plates in said trailing position, a pair of carrier plates pivotally mounted on each pair of said support plates for vertically swinging movement, a wheel and axle assembly carried by each pair of said carrier plates, and means for vertically swinging said carrier plates so as to raise and lower said frame and bed between transport and loading positions.

10. The combination defined in claim 9 wherein said bed and frame are generally rectangular and said pairs of support plates are mounted adjacent the rear corners of said frame, and said wheel and axle assemblies being disposed outboard of said bed and frame when said support plates are swung to said transversely oriented positions whereby substantially the entire rear edge of said bed is available for loading and unloading said trailer.

References Cited

UNITED STATES PATENTS

| | | | |
|---|---|---|---|
| 2,513,855 | 7/1950 | Fogwell | 214—506 |
| 2,806,710 | 9/1957 | Mascaro. | |
| 2,861,811 | 11/1958 | Lassen. | |
| 3,215,296 | 11/1965 | Preston | 214—506 |
| 3,264,009 | 8/1966 | Langendorf | 280—81 |

FOREIGN PATENTS

| | | |
|---|---|---|
| 805,043 | 12/1956 | Great Britain. |

GERALD M. FORLENZA, *Primary Examiner.*

ALBERT J. MAKAY, *Assistant Examiner.*